United States Patent
Wendler et al.

(10) Patent No.: US 12,475,927 B1
(45) Date of Patent: Nov. 18, 2025

(54) TAPE DRIVE CLEANING DEVICE

(71) Applicant: INTERNATIONAL BUSINESS MACHINES CORPORATION, Armonk, NY (US)

(72) Inventors: Peter Walter Wendler, Tucson, AZ (US); Shawn M. Nave, Tucson, AZ (US); Mark Raper, Tucson, AZ (US); Gregory Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/665,011

(22) Filed: May 15, 2024

(51) Int. Cl.
*G11B 23/50* (2006.01)
*G11B 15/68* (2006.01)

(52) U.S. Cl.
CPC ........ *G11B 23/502* (2013.01); *G11B 15/6835* (2013.01)

(58) Field of Classification Search
None
See application file for complete search history.

(56) References Cited

U.S. PATENT DOCUMENTS

| | | | | |
|---|---|---|---|---|
| 3,537,710 | A * | 11/1970 | Isom | G11B 23/50 |
| | | | | 15/210.1 |
| 4,843,508 | A * | 6/1989 | Mannheimer | G11B 5/41 |
| 4,868,700 | A * | 9/1989 | Fritsch | G11B 23/0327 |
| | | | | 360/99.18 |
| 5,235,485 | A * | 8/1993 | Martin | G11B 5/41 |
| | | | | 360/137 |
| 5,546,257 | A * | 8/1996 | Jennings | G11B 7/121 |
| | | | | 360/99.15 |
| 6,414,816 | B2 * | 7/2002 | Hikita | G11B 15/6835 |
| | | | | 360/92.1 |
| 6,744,592 | B2 * | 6/2004 | Randall | G11B 33/1446 |
| | | | | 360/92.1 |
| 6,865,053 | B2 * | 3/2005 | Bengds | G11B 15/6825 |
| 6,900,964 | B2 * | 5/2005 | Argumedo | G11B 23/107 |
| | | | | 360/132 |
| 7,347,334 | B2 | 3/2008 | Thorn | |
| 8,675,301 | B2 | 3/2014 | Thompson | |
| 10,888,026 | B2 | 1/2021 | Nave | |
| 2002/0098347 | A1 * | 7/2002 | Szonn | B32B 25/12 |
| | | | | 428/354 |
| 2002/0144048 | A1 * | 10/2002 | Bolt | G06F 3/0658 |

(Continued)

OTHER PUBLICATIONS

"3592 Cleaning Cartridge," IBM Corporation, Jan. 18, 2022, 3 pp. [retrieved on Nov. 3, 2023] Retrieved from the Internet <URL: https://www.ibm.com/docs/en/ts4500-tape-library?topic=media-3592-cleaning-cartridge>.

*Primary Examiner* — William J Klimowicz
(74) *Attorney, Agent, or Firm* — Konrad, Raynes, Davda & Victor LLP; David Victor

(57) ABSTRACT

Provided are a tape drive cleaning device, tape drive library deploying a tape drive cleaning device, and method for using a tape drive cleaning device. The tape drive cleaning device is used to clean a tape drive having a tape drive loader tray in which a tape cartridge is inserted. The tape drive cleaning device includes a body and a material attached to the body. Dimensions of the body with the material are configured to fit into the tape drive loader tray to have the material engage a tray inner surfaces of the tape drive loader tray. The material is configured to collect debris on the tray inner surfaces when engaged with the tray inner surface.

20 Claims, 9 Drawing Sheets

(56) References Cited

U.S. PATENT DOCUMENTS

| | | | |
|---|---|---|---|
| 2003/0056808 A1* | 3/2003 | Randall | G11B 33/1446 15/210.1 |
| 2003/0205244 A1* | 11/2003 | Randall | B08B 7/0028 15/210.1 |
| 2004/0076085 A1 | 4/2004 | Patterson | |
| 2004/0194802 A1* | 10/2004 | Bengds | G11B 33/121 15/93.1 |
| 2006/0072234 A1* | 4/2006 | Biskeborn | G11B 5/41 360/69 |
| 2007/0133127 A1* | 6/2007 | Stamm | G11B 23/049 |
| 2008/0259485 A1* | 10/2008 | Biskeborn | G11B 5/41 360/69 |
| 2010/0188776 A1* | 7/2010 | Biskeborn | G11B 5/41 360/128 |

* cited by examiner

Cartridge Inventory Entry

TAPE DRIVE CLEANING DEVICE

BACKGROUND OF THE INVENTION

1. Field of the Invention

Provided are a tape drive cleaning device, tape drive library deploying a tape drive cleaning device, and method for using a tape drive cleaning device.

2. Description of the Related Art

Automated tape libraries are commonly used to store massive amounts of data at low cost. The basic operation of an automated tape library is to have a robot move tape cartridges from storage locations to tape drives where the data on the tape cartridge can be read or written to. In a large tape library, there are multiple tape drives and numerous tape cartridges, such as thousands.

Typical solutions for cleaning tape drives utilize cleaning cartridges to clean the tape head of the tape drive.

SUMMARY

Provided are a tape drive cleaning device, tape drive library deploying a tape drive cleaning device, and method for using a tape drive cleaning device. The tape drive cleaning device is used to clean a tape drive having a tape drive loader tray in which a tape cartridge is inserted. The tape drive cleaning device includes a body and a material attached to the body. Dimensions of the body with the material are configured to fit into the tape drive loader tray to have the material engage a tray inner surfaces of the tape drive loader tray. The material is configured to collect debris on the tray inner surfaces when engaged with the tray inner surface.

DETAILED DESCRIPTION

Although current tape cleaning cartridges clean the tape head, such tape head cleaning cartridges do not clean a loader tray of the tape drive to remove debris that can prevent a data tape cartridge from being loaded into the tape drive. Current techniques to clean the tape drive loader tray and loader mechanism involve manually using a cloth and cleaning agent, such as isopropyl alcohol. However, it is difficult for the user to reach all of the locations inside the loader tray of the tape drive to remove debris. Also, it would be very time consuming to have to manually clean numerous tape drives in a tape library.

Described embodiments provide improvements to tape drive technology by providing a tape drive cleaning device that may be used to efficiently remove debris from the tape drive loading tray. In further embodiments, the tape drive cleaning device may comprise a tape drive cleaning cartridge for use in a tape library. A gripper assembly may transport the tape drive cleaning cartridge from a slot in the tape library to insert into the tape drive to remove debris from the tape drive loader tray.

Figure 1A:
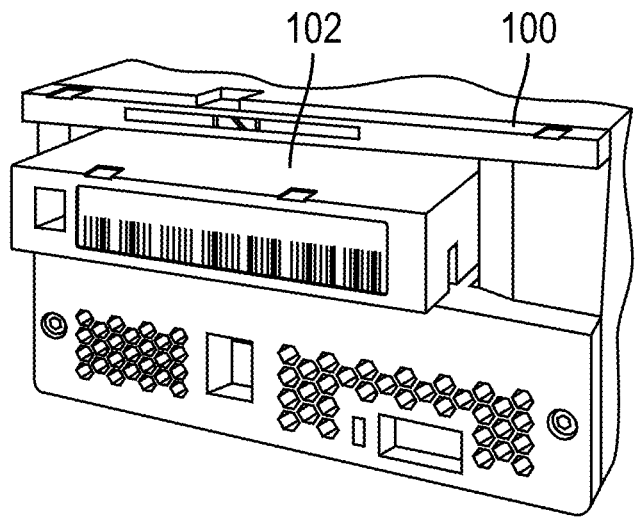
FIGS. 1A, 1B, and 1C illustrate embodiments of a tape drive and tape drive loader tray.

FIG. 1A illustrates an implementation of a tape drive 100 with a tape cartridge 102 partially inserted into the tape drive 100.

Figure 1B:
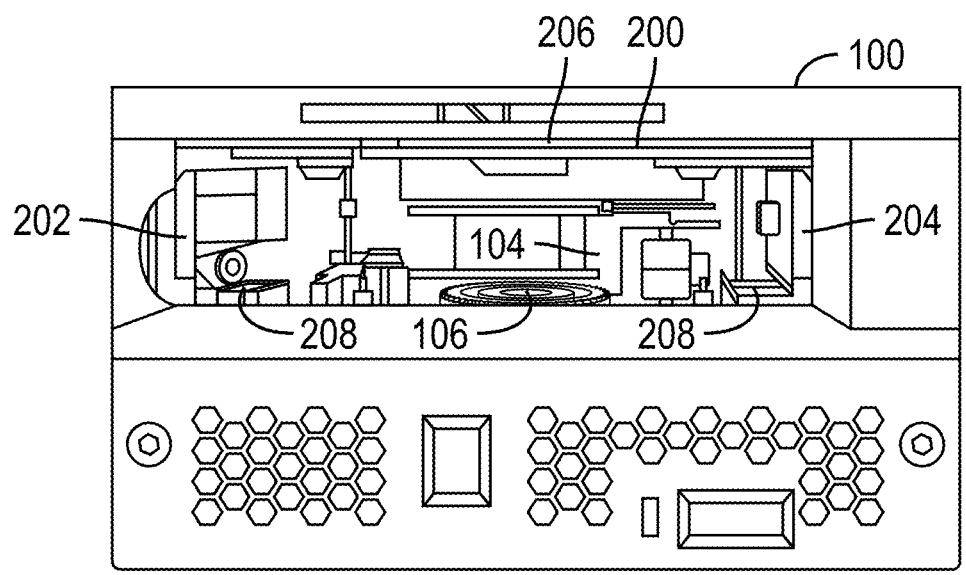
Figure 2:
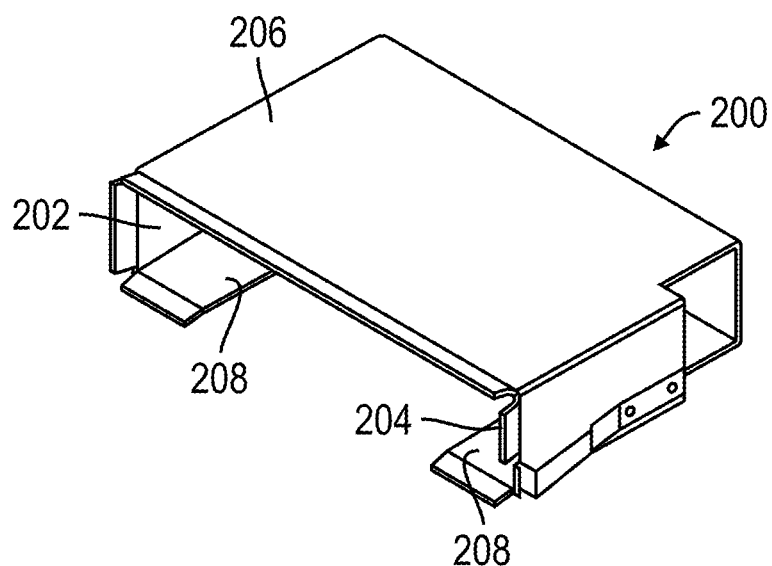
FIG. 2 illustrates an embodiment of a tape drive loader tray.

FIG. 1B shows a tape drive 100 that is empty, i.e. no tape cartridge 102. The tape drive includes a loader tray 200 in which the tape cartridge 102 is inserted. The loader tray 200 is also shown in FIG. 2. With respect to FIG. 2, the tray 200 has a left side 202, right side 204, an upper portion 206, and lower flanges 208. The tape cartridge 102 is positioned within the tray 200. The sides 202, 204 and upper portions 206 form tray inner surfaces including tray side inner surfaces of sides 202, 204 and a tray top inner surface of upper portion 206. A loading mechanism 104 comprises mechanical parts 104 of the tape drive 100 that engage the cartridge 102, including a clutch 106, to lower the tape cartridge 102 into the tape drive 100 to access the tape media. The loader mechanism 104 extends into the loader tray 204 interior.

Figure 1C:
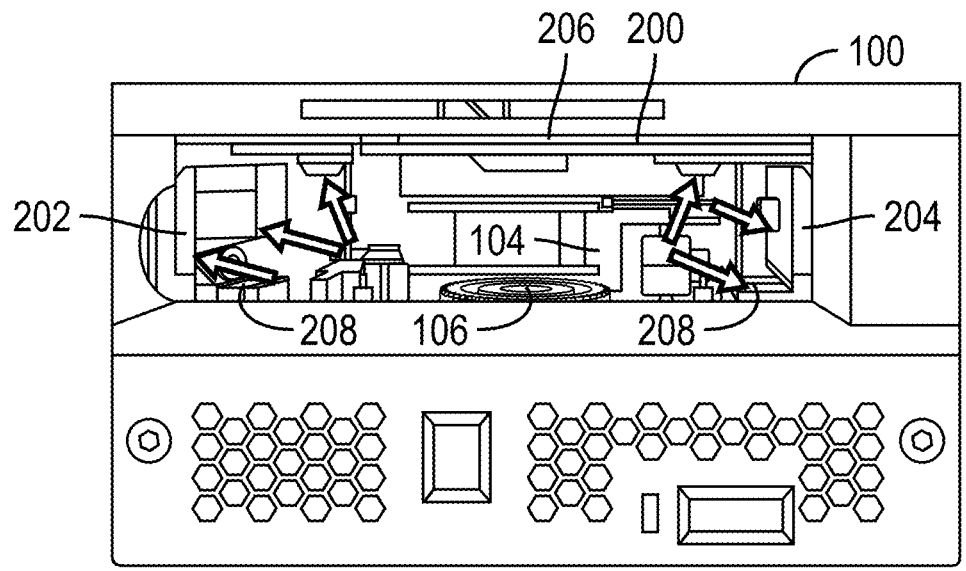

FIG. 1C illustrates a prior art tape drive 100 and shows the inner space of the loader tray 200 with the loading mechanisms 104, as in FIG. 1B with arrows that point to areas of the loader tray 204 inner surface where debris is most likely to collect.

Figure 3A:
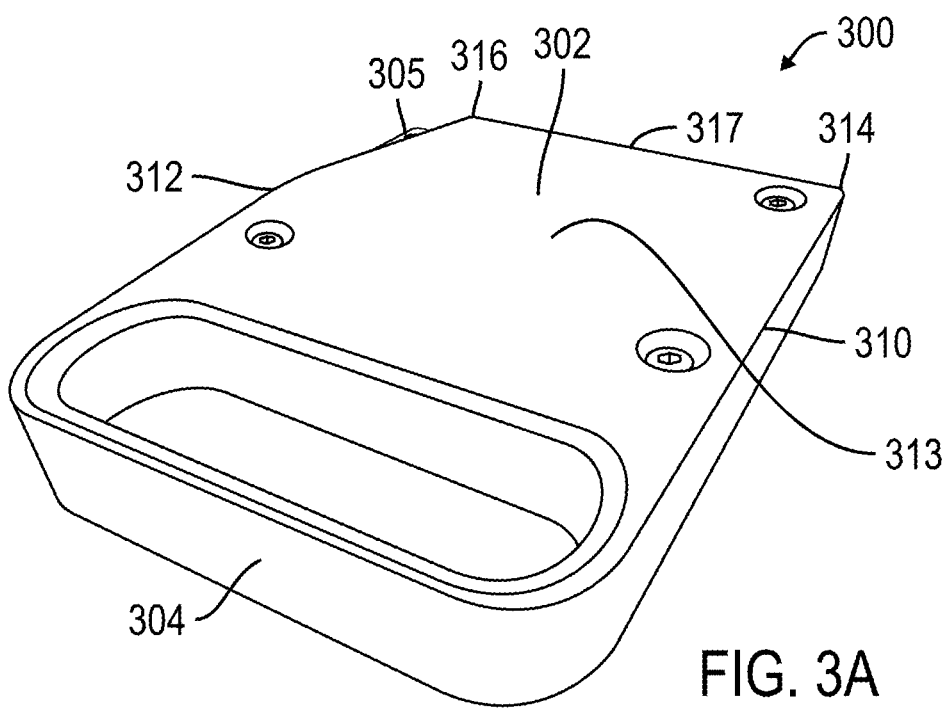
FIGS. 3A, 3B, 3C, and 3D illustrate an embodiment of a tape drive cleaning device.
Figure 3B:
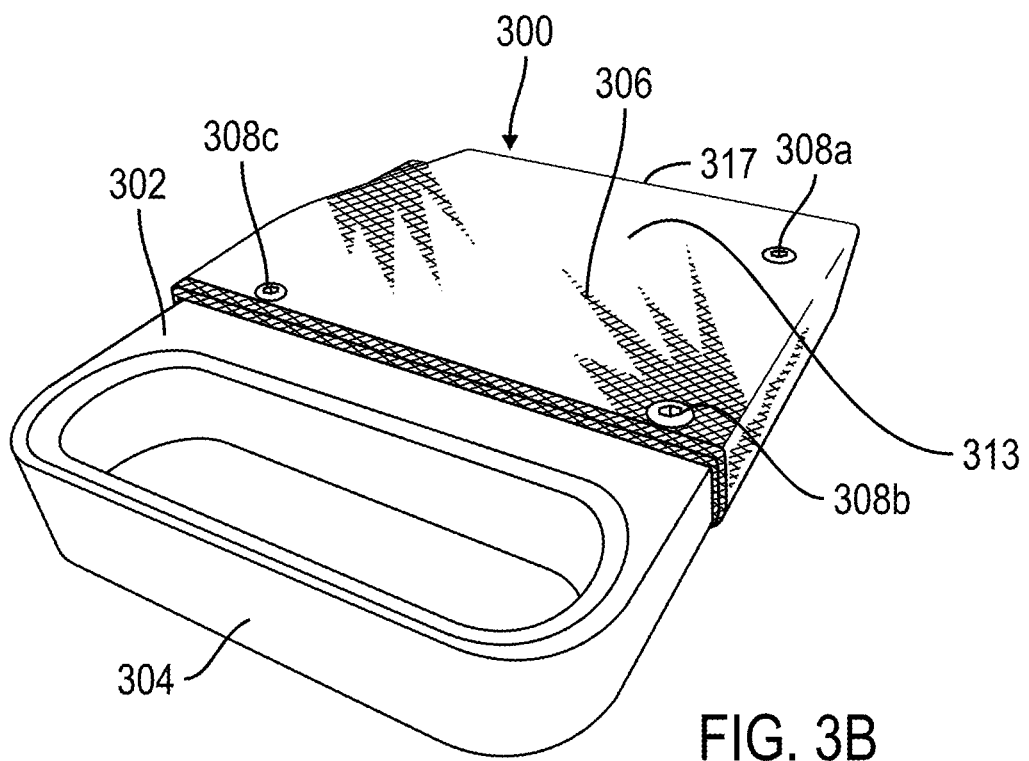

FIGS. 3A and 3B illustrate an embodiment of a tape drive cleaning device 300 comprised of a body 302 having an attached handle 304 for gripping and an attached material 306. When the tape drive cleaning device 300 is inserted in the loader tray 204 the material 306 will remove debris that has accumulated on inner surfaces of the loader tray 200. In certain embodiments, the portion of the body 302 that is positioned in the loader tray 204 may have dimensions and contours matching those of the data tape cartridge 102 intended for the tape drive. FIG. 3A shows the left side 305 of the body 302 having an indentation such as found in a tape cartridge 102, such as a Linear Tape Open (LTO) tape cartridge.

The material 306 may be positioned at locations of the body 302 that will contact the portions of the inner surface of the loader tray 204 where the debris is most likely to collect, as shown by the arrows in FIG. 1C. For instance, material 306 may be located on portions of the body 302 on the right 310 and left 312 sides of the body, such as body side surfaces and a body top surface 313, including at the upper corners 314, 316 of a body back surface 317, where the right 310 and left 312 sides meet the front surface 304 of the body 302, as shown in FIG. 3A. In this way, the material 306 does not have to cover substantially all of the body 302 as shown in FIG. 3B. Instead, separate pieces of material may be attached to those portions of the body 302 most likely to contact areas of the tray inner surfaces of the loader tray 204 having debris, as shown by the arrows in FIG. 1C. For instance, the material 306 may be attached to at least a portion of the body side surfaces 310, 312 and a body top surface 313 configured to engage the tray side inner surfaces 202, 204 and tray top inner surface 206. The material 306 may further be attached at corners 314, 316 of the body side surfaces 310, 312 at the body top surface 313 to engage corners of the tray side 202, 204 and top 206 inner surfaces.

Further, wherein the body 302 has a body back surface, opposite the body front surface 304, configured to be positioned adjacent a loader back surface of the tape drive loader tray. A body front surface 304 of the body 302, opposite the body back surface, may have dimensions and contours substantially similar to the dimensions and contours of a cartridge front surface of a tape cartridge to allow the body 302 to fit into the tape drive loader tray 200.

In FIG. 3B, the material 306 is shown as attached with mechanical fasteners comprising screws 308a, 308b, 308c. In alternative embodiments, the material 306 may be attached to the body 302 with alternative attachment mechanisms, such as an adhesive, snaps, rivets, hook-and-loop fasteners, such as Velcro®, etc. (Velcro is a registered trademark of Velcro IP Holdings LLC throughout the world).

The material 306 may comprise a material suitable for collecting debris gathered on the tape drive loader tray inner surfaces formed of one or more component materials, such as, without limitation, a microfiber, a shammy formed from an artificial material, a lint free towel, a polyvinyl alcohol cloth, polyester, polyester cooling mesh, polyamide, and a water-soluble synthetic polymer cloth.

The combined dimensions of the body 302 and attached material 306 may have dimensions similar to that of a tape cartridge 102 and capable of fitting into the loader tray 200. The combined dimensions of the body 302 and material 306 would be designed to allow the material 306 to engage the inner surfaces of the loader tray 204 when the body 302 is inserted into the loader tray 200.

In embodiments where the fasteners are easily removable, the material 306 may be removed by first removing the material, such as removing the fastener screws 308a, 308b, 308c, then replacing with new materials, and then reattaching or fastening the replaced material to the body 302.

Figure 3C:
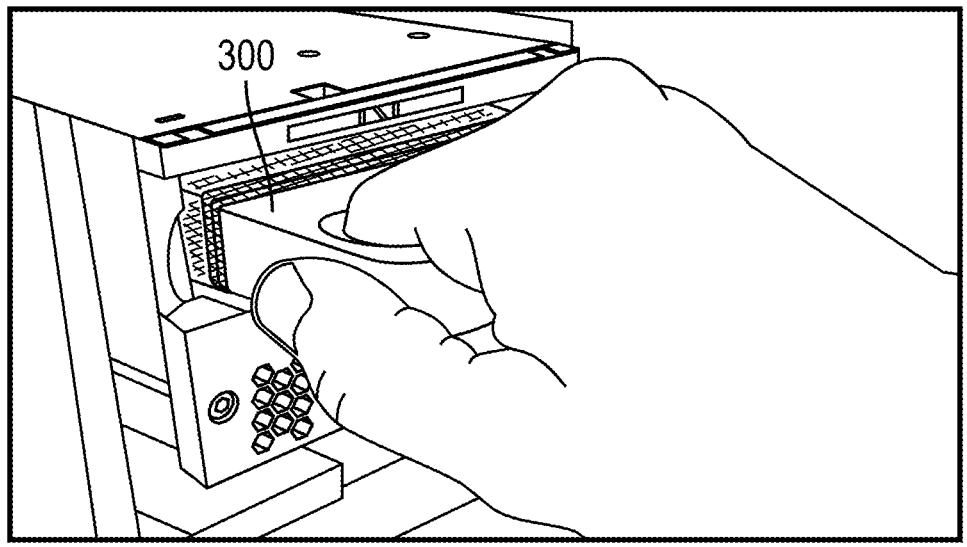
Figure 3D:
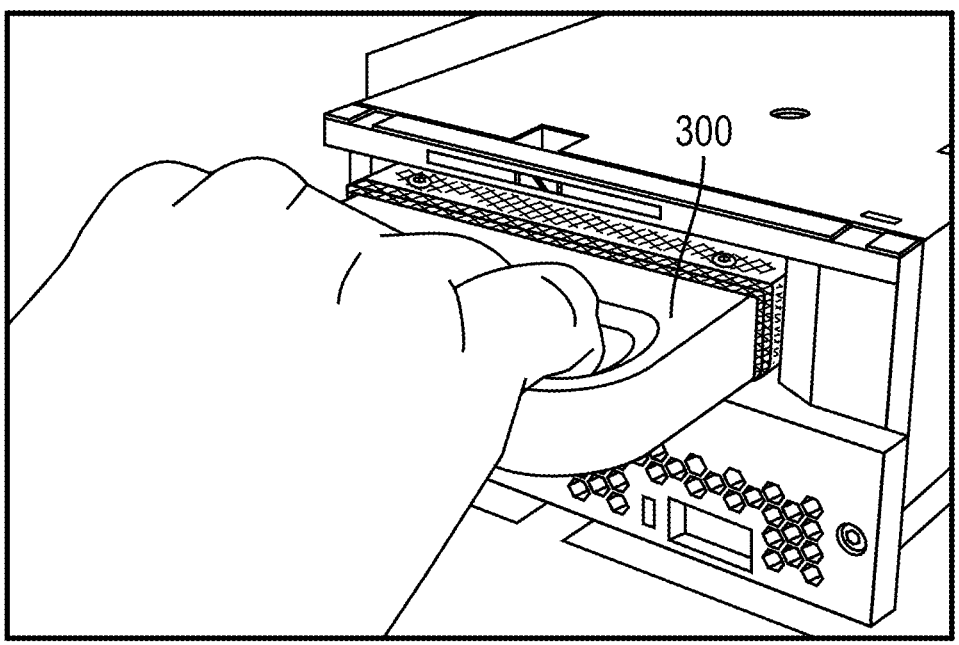

FIGS. 3C and 3D illustrate how the tape drive cleaning device 300 is manually inserted into the loader tray 200 opening.

Figure 4A:
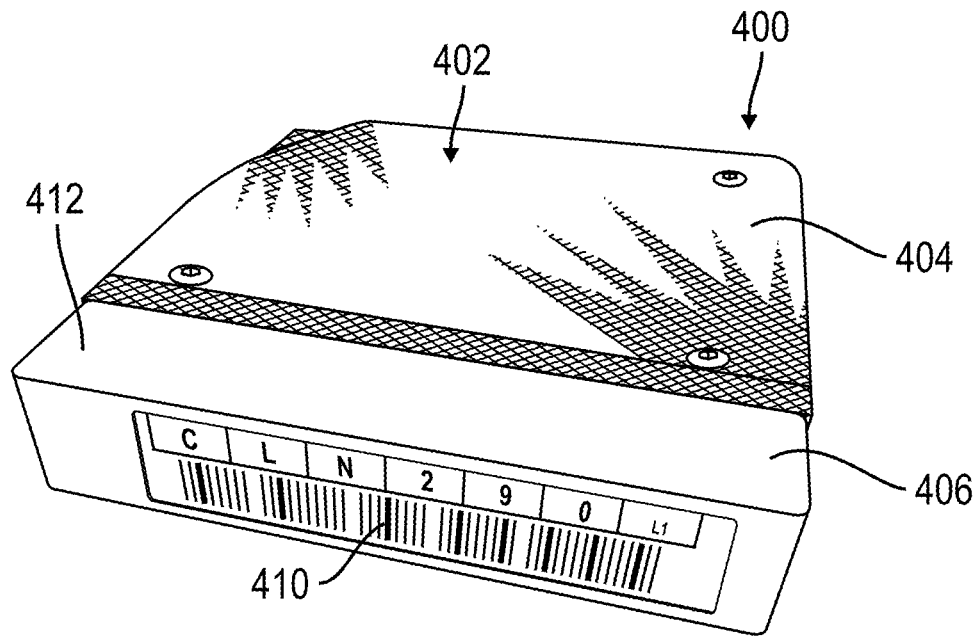
FIGS. 4A, 4B, and 4C illustrate an embodiment of a tape drive cleaning cartridge.
Figure 4B:
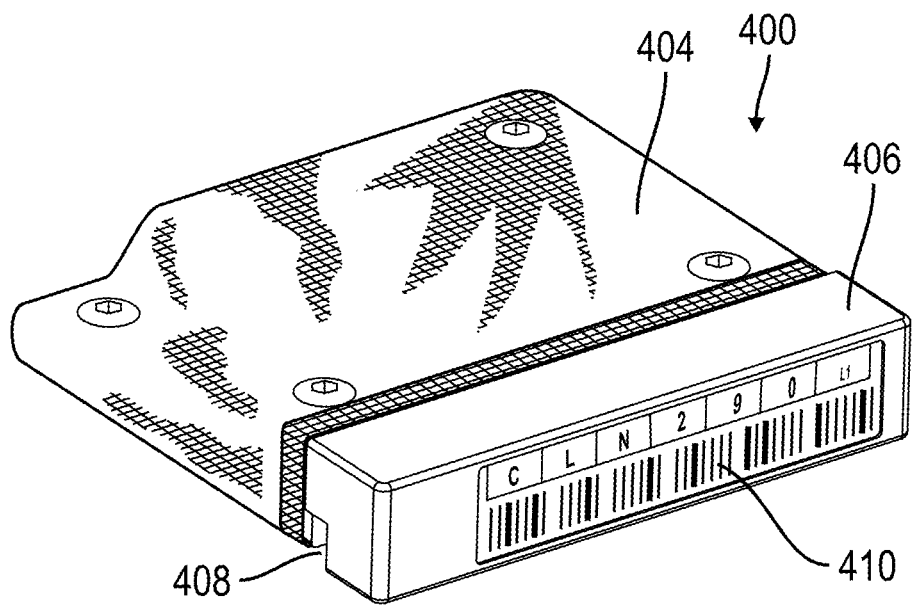
Figure 4C:
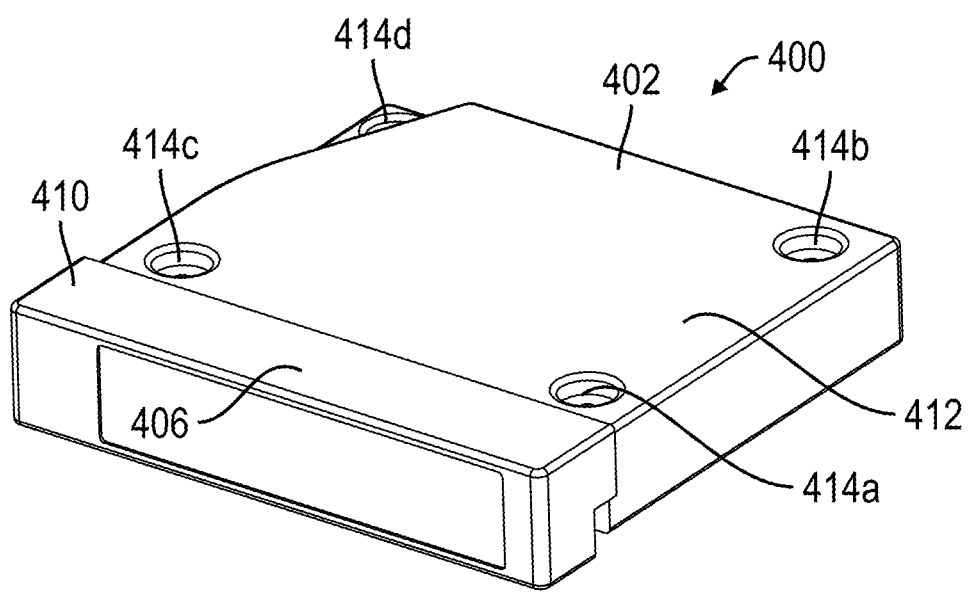

FIGS. 4A, 4B, and 4C illustrate an alternative embodiment of the tape drive cleaning device as comprising a tape drive cleaning cartridge 400 having a body 402, under the material 404, with a shape similar to that of an LTO tape cartridge and with a material 404 attached to the body 402. A front portion 406 of the cleaning cartridge 400 has a shape similar to that of the front portion of an LTO tape cartridge, including notches 408 for gripping by a gripper assembly in a tape library, as shown in FIG. 5. The cleaning cartridge 400 may further include a bar code 410 for identification.

As shown in FIG. 4C, the body 402 of the cleaning cartridge 400 may have a surface lower than a top surface 412 of the front portion 406 so when the material 404 is attached to the body, the top surface of the material 404 may be flush with the front portion 406. Further, as shown in FIG. 4C, the body 402 has dimensions and contours to match that of an LTO data tape cartridge. The body 402 further includes openings 414a, 414b, 414c, 414d for screw fasteners to attach the material 404 to the body 402.

Figure 5A:
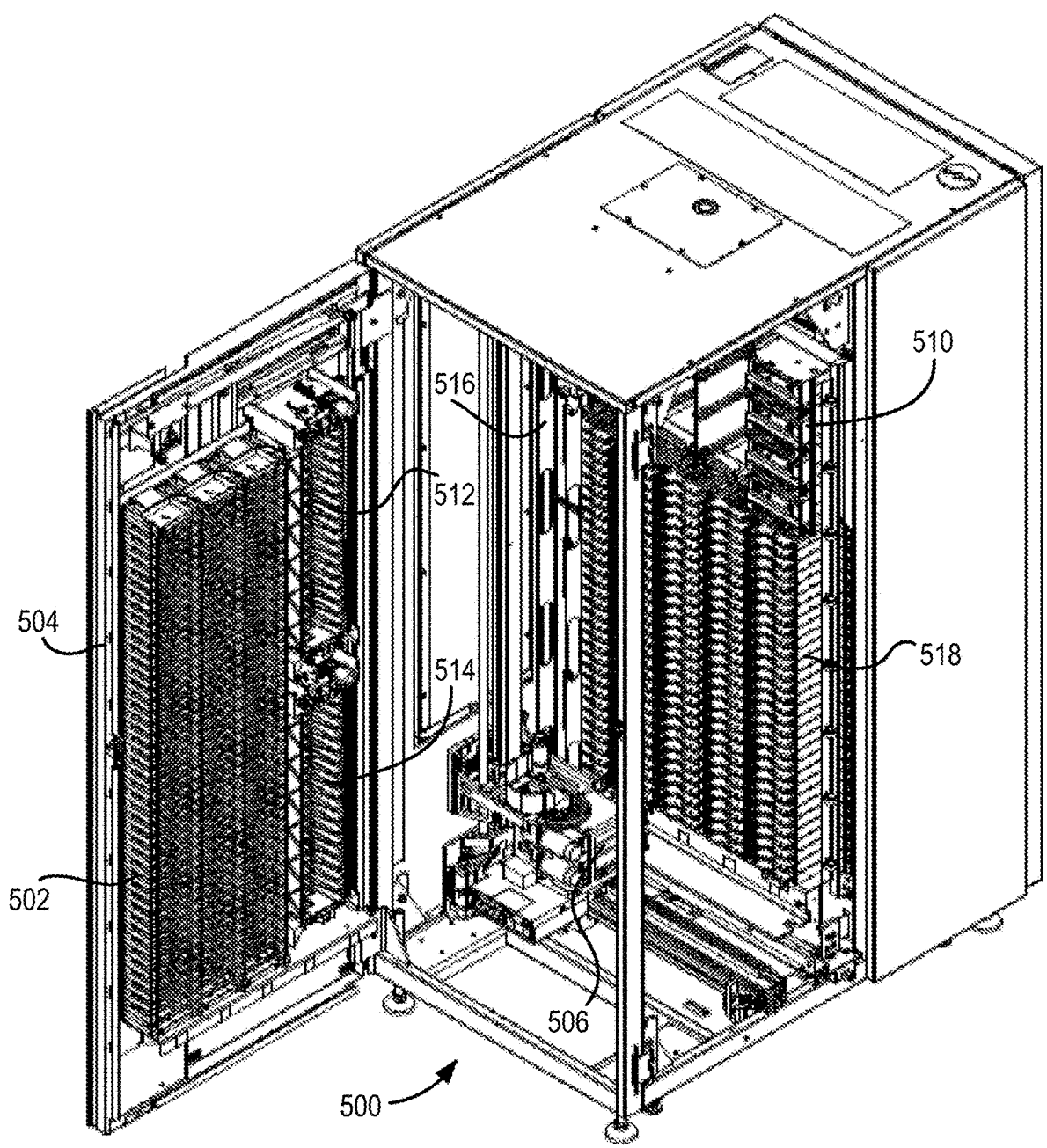
FIGS. 5A and 5B illustrate an embodiment of a tape library.

FIG. 5A illustrates an embodiment of a tape library 500 having storage cells 502 on a front wall 504 to store tape cartridges 102 and tape drive cleaning cartridges 400, an accessor 506 that includes a bar code scanner and/or gripper assembly, of a tape library robot, to read a bar code on the tape or cleaning cartridge, and tape drives 510. The gripper assembly may grip a data or cleaning cartridge from one of the storage cells or slots 502 on a front wall 504 and move to a tape drive 510 to read the tape media in the cartridge for a data tape cartridge 102 or to clean the tape drive loader tray in the tape drive 510 for a cleaning cartridge 400. The tape library 500 further includes Input/Output stations 512, 514 at which cartridges are removed from or added to the library 500 and a rear wall 516 having deep slots 518 capable of storing multiple cartridges.

Figure 5B:
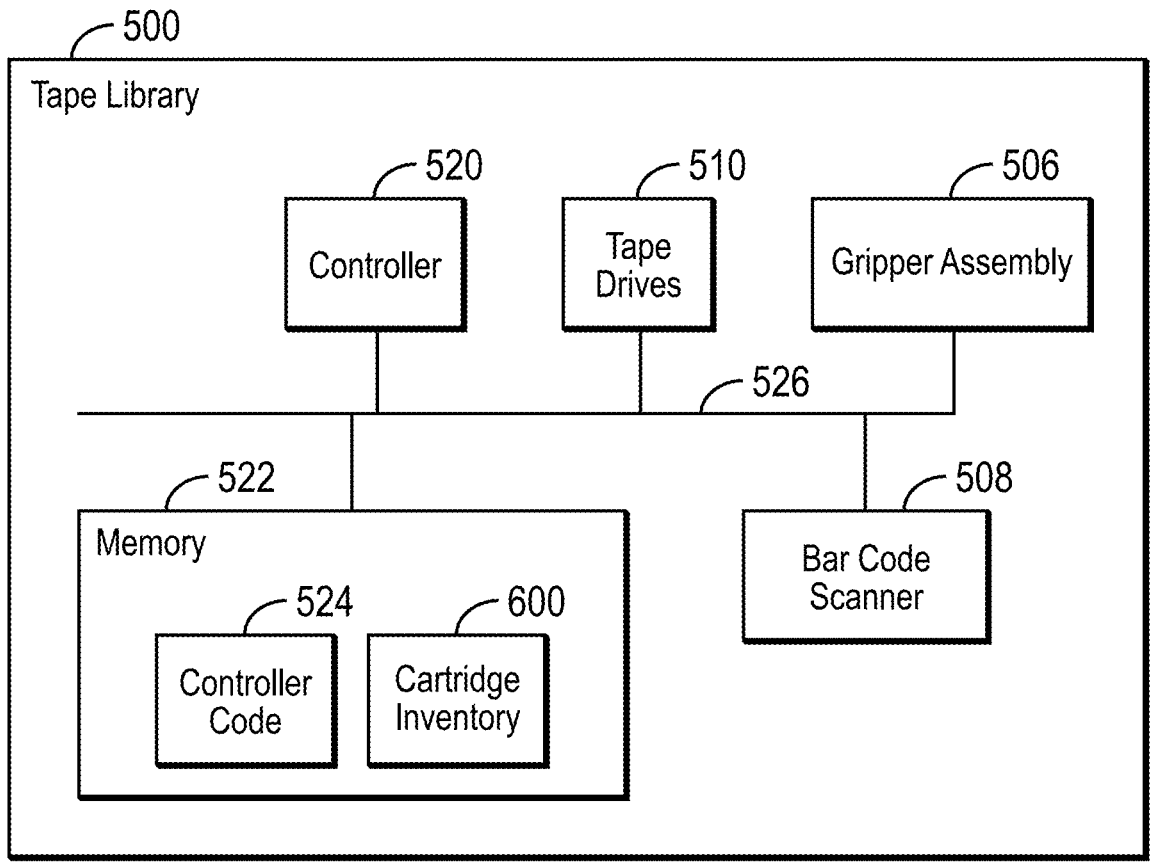

FIG. 5B illustrates an embodiment of the components of the tape drive 500, including the library controller 520, a memory 522 including controller code 524, such as firmware, to control the controller 520, and a cartridge inventory 600 having information on data cartridges 102 and cleaning cartridges 400 maintained in the slots 502 and tape drives 510 of the tape library 500. A communication bus 526 allows communication of data and commands between the controller 520 and the gripper assembly, tape drives 510, and bar code scanner.

The controller code 524 may be accessed by the controller 520 from the memory 522 to execute. Alternatively, the controller 520 and controller code 524 may be implemented in hardware devices, such as Application Specific Integrated Circuit (ASIC), Field Programmable Gate Arrays (FPGAs), and other hard devices hardware devices.

The functions described as performed by the controller code 524 may be implemented as program code in fewer program modules than shown or implemented as program code throughout a greater number of program modules than shown.

The memory 522 may comprise a suitable volatile or non-volatile memory device, such as a Dynamic Random Access Memory (DRAM), a solid-state storage device (SSD), etc.

Figure 6:
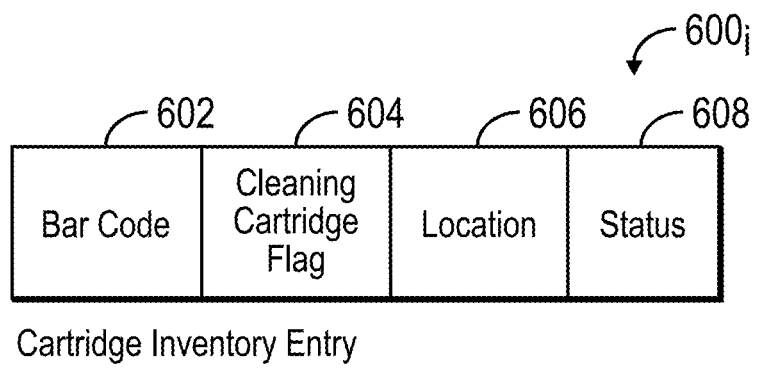
FIG. 6 illustrates an embodiment of a tape cartridge inventory entry.

FIG. 6 illustrates an embodiment of a cartridge inventory entry $600_i$ in the cartridge inventory 600 and indicates a bar code 602 on a bar code label 410 of the data 102 or cleaning cartridge 400; a cleaning cartridge flag 604 indicating whether the cartridge is a data cartridge 102 or cleaning cartridge 400; a location 606 of the cartridge, such as in a storage cell 502, in a tape drive 510 or in process of being transported between a storage cell 502 and a tape drive 510; and a status 608. For a cleaning cartridge 400, the status 608 may indicate available to use for cleaning a tape drive 510 or unavailable. An unavailable cleaning cartridge 400 may have been used a certain number of times for cleaning and require cleaning before being reused. An available cleaning cartridge 400 indicates it is ready to be used and does not require cleaning.

Figure 7:
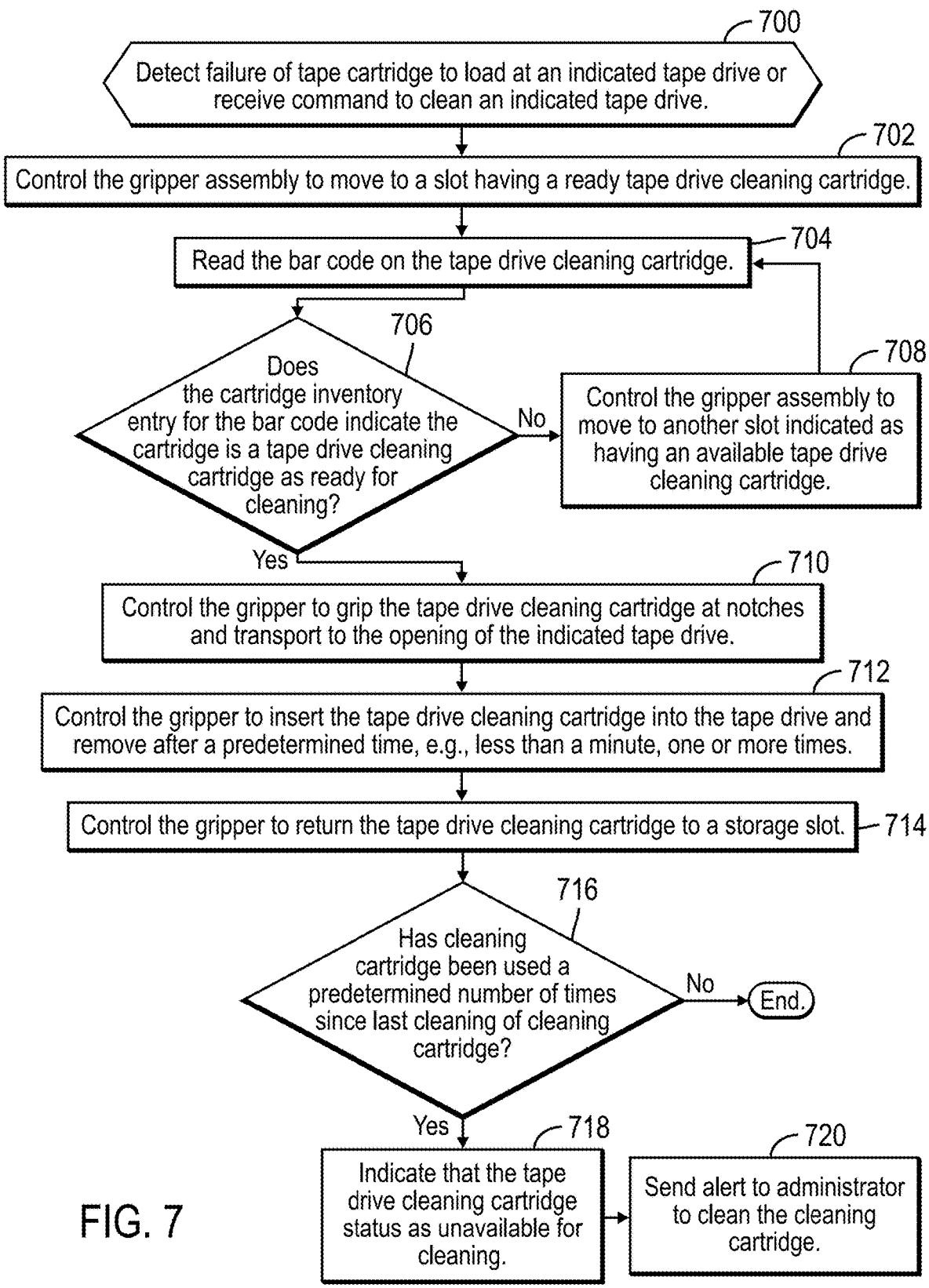
FIG. 7 illustrates an embodiment of operations performed in a tape library to utilize a tape drive cleaning cartridge to clean the tape drive loader tray of a tape drive in the tape library.

FIG. 7 illustrates an embodiment of operations performed by the controller 520 to utilize a tape drive cleaning cartridge 400 in a tape library 500. Upon the controller 520 detecting (at block 700) a failure of a tape data cartridge 102 to load into the tape drive 510 or receiving a command to clean an indicated tape drive 510, the controller 520 controls (at block 702) the gripper assembly 508 to move to a slot 512, 518 having a tape drive cleaner cartridge 400 having an available status 608. The controller 520 may detect the failure of a data tape cartridge 102 to load in response to a notification from a tape drive 510 of such failure. The controller 520 controls (at block 704) the bar code scanner 506 to read a bar code 410 on the tape drive cleaning cartridge 400. If (at block 706) the cartridge inventory entry $600_i$ for the scanned bar code 410 indicates that the tape drive cleaner cartridge 400 is not available for cleaning, i.e., has a status 608 of unavailable, then the controller 520 controls the gripper assembly 506 to move to another slot 502 having an available tape drive cleaner cartridge and proceeds back to block 704 to confirm the identify of the cartridge in slot 502.

If (at block 706) the cartridge inventory entry $600_i$ for the scanned cartridge indicates it is a tape drive cleaning cartridge 400 available for cleaning, i.e., a status 608 of available, then the controller 520 controls (at block 710) the gripper assembly 506 to grip the tape drive cleaner cartridge 400 at notches 408 and transport the cartridge 400 to the opening of the indicated tape drive 510. The controller 520 controls (at block 712) the gripper assembly 508 to insert the tape drive cleaner cartridge 400 into the tape drive 510 and remove after a predetermined time, e.g., less than a minute, one or more times to clean the inner surface 202, 204 of the tape drive loader tray 200 to remove debris. After completing the cleaning, the controller 520 controls (at block 714) the gripper assembly 508 to return the tape drive cleaner cartridge 400 to a storage slot 502. If (at block 716) the cleaning cartridge 400 has been used a predetermined number of times since the last cleaning of the cleaning cartridge 400, then the controller 520 updates (at block 718) the cartridge inventory entry 6001 for the returned cleaning cartridge 400 to indicate, in status 608, that the tape drive cleaner cartridge 400 is unavailable for cleaning. The controller 520 may further alert (at block 720) an administrator to clean the cleaning cartridge 400. Once the administrator notifies the controller 520 that the cartridge 400 has been cleaned, the controller 520 will set the status 608 to available. If (at block 716) the cleaning cartridge 400 has not been used the predetermined number of times since the last cleaning, control ends.

With the embodiment of FIG. 7, a tape drive cleaning cartridge 400 may be used in a tape library 500 to clean the inner surfaces of the tape drive loader tray 200 to remove debris that may prevent tape cartridges from being properly inserted into the tape drives 510.

In the described embodiment, variables such as i, etc., when used with different elements may denote a same or different instance of that element.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Terms such as "top", bottom", "upper", "lower", "rear", "front", "back", "side", "outer", "inner", "bottom", "left", and the like may be used for descriptive purposes only and are not to be construed as limiting. Embodiments may be manufactured, used, and contained in a variety of positions and orientations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by a machine system to manufacture a tape erase element and tape erase device including the tape erase element.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape drive cleaning device to clean a tape drive having a tape drive loader tray comprising tray side inner surfaces and a tray top inner surface in which a tape cartridge is inserted, comprising:
   a body having a body top surface and body side surfaces, wherein the body top surface has a greater surface area than a surface area of each of the body side surfaces; and
   a material attached to the body and extending across the body top surface, wherein dimensions of the body with the material are configured to fit into the tape drive loader tray to have the material engage a tray top inner surface of the tape drive loader tray, wherein the body with the attached material are configured to collect debris on the tray top inner surface when positioned within the tape drive loader tray.

2. The tape drive cleaning device of claim 1, further comprising:
   a handle coupled to the body that is configured for gripping by a user to position the body with the attached material into the tape drive loader tray to have the material engage the tray tp inner surface.

3. The tape drive cleaning device of claim 1, wherein the material is formed from at least one material that is a member of a set of materials consisting of: a microfiber, a shammy formed from an artificial material, a lint free towel, a polyvinyl alcohol cloth, polyester, polyester cooling mesh, polyamide, and a water-soluble synthetic polymer cloth.

4. The tape drive cleaning device of claim 1, wherein the material is attached to at least a portion of the body side surfaces and configured to engage the tray side inner surfaces, and wherein the material is attached at corners of the body side surfaces at the body top surface to engage corners of the tray side inner surfaces.

5. The tape drive cleaning device of claim 1, wherein the material is attached to the body with an attachment mechanism that is a member of a set of attachment mechanisms consisting of an adhesive, mechanical fasteners, and hook-and-loop fasteners.

6. The tape drive cleaning device of claim 1, wherein the body has a body back surface configured to be positioned adjacent a loader back surface of the tape drive loader tray and a body front surface of the body opposite the body back surface, wherein the body front surface has dimensions and contours substantially similar to that of a cartridge front surface of a tape cartridge for the tape drive loader tray.

7. The tape drive cleaning device of claim 1, wherein the body has a notch on each side to enable a gripper of a tape library robot to clasp the body to position in and out of the tape drive loader tray.

8. A tape library, comprising:
a tape drive having a tape drive loader tray comprising tray side inner surfaces and a tray top inner surface in which a tape cartridge is inserted;
slots for tape cartridges;
a slot including a tape drive cleaning cartridge, wherein the tape drive cleaning cartridge comprises:
a body having a body top surface and body side surfaces, wherein the body top surface has a greater surface area than a surface area of each of the body side surfaces; and
a material attached to the body and extending across the body top surface, wherein dimensions of the body with the material are configured to fit into the tape drive loader tray to have the material engage a tray top inner surface of the tape drive loader tray, wherein the body with the attached material are configured to collect debris on the tray top inner surface when positioned within the tape drive loader tray;
a gripper assembly; and
a controller programmed to control the gripper assembly to grip the body and transport the tape drive cleaning cartridge from the slot to insert in a tape drive loader tray of a selected tape drive to have the material engage the tray top inner surface.

9. The tape library of claim 8, wherein the material is attached to at least a portion of the body side surfaces and configured to engage the tray side inner surfaces, and wherein the material is attached at corners of the body side surfaces at the body top surface to engage corners of the tray side inner surfaces.

10. The tape library of claim 8, wherein the body with the attached material has dimensions and contours similar to a data tape cartridge for the tape drive.

11. The tape library of claim 8, wherein the body has a notch on each side to enable a gripper of a tape library robot to clasp the body to position in and out of the tape drive loader tray.

12. The tape library of claim 8, wherein the controller is programmed to direct the gripper assembly to insert the body into the tape drive loader tray and remove the body from tape drive loader tray to collect debris on the tray top inner surface.

13. The tape library of claim 8, wherein the controller is further programmed to:
detecting a failure of a tape cartridge to load in the tape drive, wherein the controller is programmed to control the gripper assembly to clasp the body to transport the tape drive cleaning cartridge from the slot to insert in the tape drive loader tray in response to detecting the failure of the tape cartridge to load into the tape drive.

14. The tape library of claim 8, further comprising:
a bar code reader, wherein the controller is further programmed to perform:
controlling the bar code reader to read a bar code on a cartridge in a slot; and
determining whether the read bar code indicates the cartridge in the slot comprises a tape drive cleaning cartridge, wherein the transporting the tape drive cleaning cartridge from the slot to insert in the tape drive loader tray are performed in response to determining that the read bar code comprises a tape drive cleaning cartridge.

15. The tape library of claim 8, wherein the controller is further programmed to:
indicating a status of the tape drive cleaning cartridge as unavailable in response to the tape drive cleaning cartridge used a predetermined number of times to clean a tape drive since a last cleaning of the tape drive cleaning cartridge.

16. A method for cleaning a tape drive having a tape drive loader tray comprising tray side inner surfaces and a tray top inner surface in which a tape cartridge is inserted, comprising
providing a tape drive cleaning device, including:
a body having a body top surface and body side surfaces, wherein the body top surface has a greater surface area than a surface area of each of the body side surfaces; and
a material attached to the body and extending across the body top surface,
wherein dimensions of the body with the material are configured to fit into the tape drive loader tray to have the material engage a tray top inner surface of the tape drive loader tray, wherein the body with the attached material are configured to collect debris on the tray top inner surface when positioned within the tape drive loader tray;
inserting the tape drive cleaning device into the tape drive loader tray to have the material engage the tray top inner surface; and
removing the tape drive cleaning device from the tape drive loader tray.

17. The method of claim 16, further comprising:
replacing the material attached to the body with new material.

18. The method of claim 16, wherein the material is attached to at least a portion of the body side surfaces, and wherein the material is attached at corners of the body side surfaces at the body top surface, further comprising:
engaging, with the material on the corners of the body side surfaces, corners of the tray side inner surfaces in response to the inserting the tape drive cleaning device into the tape drive loader tray.

19. The method of claim 16, further comprising:

transporting, by a gripper assembly, the tape drive cleaning device from a slot of a tape library to an opening of the tape drive loader tray; and inserting, by the gripper assembly, the tape drive cleaning device into the tape drive loader tray to have the material engage the tray top inner surface.

20. The method of claim 19, further comprising:

detecting a failure of a tape cartridge to load in the tape drive, wherein the gripper assembly moves the tape drive cleaning device to the opening of the tape drive loader tray and inserts the tape drive cleaning device into the tape drive loader tray in response to detecting the failure of the tape cartridge to load.

\* \* \* \* \*